United States Patent [19]

Yamada

[11] 4,179,805

[45] Dec. 25, 1979

[54] PORTABLE POWER OPERATED TOOL

[75] Inventor: Sakuji Yamada, Kobe, Japan

[73] Assignee: Yamada Machinery Industrial Co., Ltd., Kobe, Japan

[21] Appl. No.: 903,084

[22] Filed: May 5, 1978

[30] Foreign Application Priority Data

Jun. 7, 1977 [JP] Japan .................................. 52-67643

[51] Int. Cl.² ...................... A01D 55/18; B26B 25/00
[52] U.S. Cl. .................................. 30/122; 30/296 R; 30/276; 172/41; 56/12.7
[58] Field of Search ...................... 30/296 R, 198, 276, 30/309; 172/41; 56/12.7; 30/122, 166

[56] References Cited

U.S. PATENT DOCUMENTS

| | | | |
|---|---|---|---|
| 70,861 | 11/1867 | Kingsly | 30/198 |
| 1,374,768 | 5/1921 | Ruppert | 30/198 X |
| 1,475,444 | 11/1923 | Mayberry | 30/198 |
| 2,697,457 | 12/1954 | Lawrence | 30/296 R |
| 3,346,955 | 10/1967 | Beneke | 30/296 R |
| 3,453,732 | 7/1969 | Wilkin | 30/296 R |
| 4,145,810 | 3/1979 | Belliston | 30/296 R |

*Primary Examiner*—Jimmy C. Peters
*Attorney, Agent, or Firm*—Birch, Stewart, Kolasch & Birch

[57] ABSTRACT

A portable power operated tool for cutting brush, mowing grass and the like which comprises a cutting implement mounted at one end of an elongated tubular housing and driven by a lightweight engine connected to the other end of the tubular housing, a fixing element for receiving and fixing a front part of an operator's right arm, the fixing element being located in position near the engine and along with one side of the elongated tubular housing, a first handle located in front of the fixing element, and a second handle located in front of the first handle and connected to the tubular housing.

18 Claims, 23 Drawing Figures

PORTABLE POWER OPERATED TOOL

BACKGROUND AND SUMMARY OF THE INVENTION

This invention relates to a portable power operated tool, and more particularly to improvements in such a type of tool as having a cutting implement mounted at one end of an elongated tubular housing and driven by a lightweight engine connected to the other end of the tubular housing, for cutting brush, mowing grass, pruning branches or performing a number of like tasks.

Figure 19:
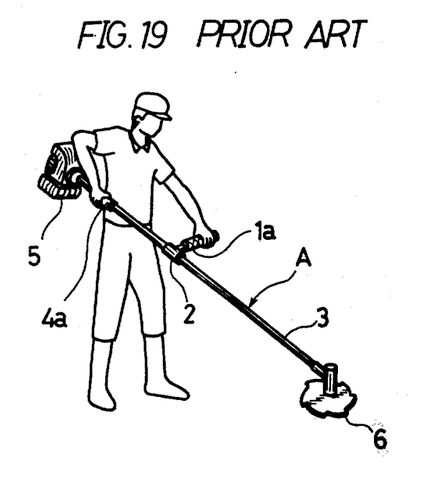
FIGS. 19 to 23 are somewhat schematic perspective views illustrating the construction and operational manners of the prior art portable power operated tools of the kind to which the present invention is directed.

In the above-mentioned type of portable power tool, several modes have heretofore been proposed, every of which, however, has considerable deficiencies in balance, safety and/or ease in manipulation during operation. For example, in use of one typical model of the conventional tool as illustrated in FIG. 19 of the accompanying drawings wherein the tool A has a handle grip 1a for the left hand which is secured to a slidable member 2 adjustably mounted on an elongated tubular housing 3 so as to extend at right angles with respect to said tubular housing 3 and a further handle grip 4a for the right hand which is axially mounted on and secured to the tubular housing 3 in place between the handle grip 1a and an engine 5, it is very difficult for the operator to hold the tool A in good balance because the engine 5 is much heavier than a cutting implement 6 which is operatively mounted to the forward end of the tubular housing 3. Therefore, when the cutting implement 6 is swung in one direction, the engine 5 is naturally swung in the opposite direction with a considerably great inertial force. In order to overcome this inertial force, the operator must handle the tool A with a physical strength at least greater than said inertial force, causing not only his fatigue but also difficulty in his quick and accurate manipulation. The latter problem is especially very important from the viewpoint of safety.

Further, supposing the cutting implement being a rotary cutter, when the rotary cutter rotating at a high speed collides with an obstacle such as a stone in the brush, the operator is occasionally subjected to so great reaction force that he can hardly hold the tool in a safe position by overcoming said reaction force imparted to him, causing thereby a great danger to someone who might be near the operator. Furthermore, as apparent from FIG. 19, the operator must hold his right elbow in an unnaturally raised position during manipulation of the tool A, it is very difficult for him to continue his performance for a long time. Further, it is almost impossible to perform a desired cutting task with maintaining the cutter 6 above the level higher than the operator's head.

Figure 20:
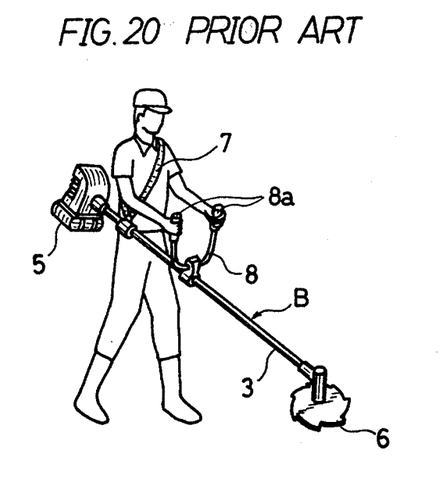

FIG. 20 shows a further example of the conventional tool as disclosed in U.S. Pat. No. 3,781,991 to Stretton et al and U.S. Pat. No. 3,453,732 to Wilkin, in which the tool B is provided with a shoulder strap 7 and a U-shaped handle 8 with a pair of grips 8a which is slidably mounted on an elongated tubular housing 3. In use of the tool B, a greater part of the weight of the tool can be supported by the operator's shoulder by means of the strap 7, apparently reducing the fatigue of the operator. However, the problem of said inertial force still remains unsolved. More particularly, when the cutter 6 is swung in one direction, the engine 5 is simultaneously swung in the opposite direction with developing a considerably great inertial force, which causes difficulty not only in holding the tool B in good balance but also in manipulating the tool very quickly and smoothly, thereby inviting the fatigue of the operator. This model of the tool is especially inconvenient in cutting grass or brush on uneven ground, since the U-shaped handle 8 will not permit to change the cutting angle of the cutter 6 very quickly in accordance with the changes of the ground configuration. The reason therefor is apparent from that it is necessary to provide a sufficient distance between one of the grips 8a and the elongated tubular housing 3 in order to permit easy manipulation of the tool B. Thus, in order to change the angle of the cutter 6 by turning the tubular housing 3 about its longitudinal axis, it is inevitable to turn the grips 8a by a large angular distance about the axis of the tubular housing 8. In other words, the operator must manipulate the tool B with a somewhat exaggerated motion, and therefore it is impossible for him to change the cutting angle of the tool B very quickly. If he tries to manipulate it very quickly, he will get tired in a very short time. Further, the tool with a U-shaped handle 8 is not very convenient for performing cutting works with the tubular housing 3 directed upwardly. The difficulty in quick control of the tool B also invites the problem of the safety in operation.

Figures 21, 22, 23:
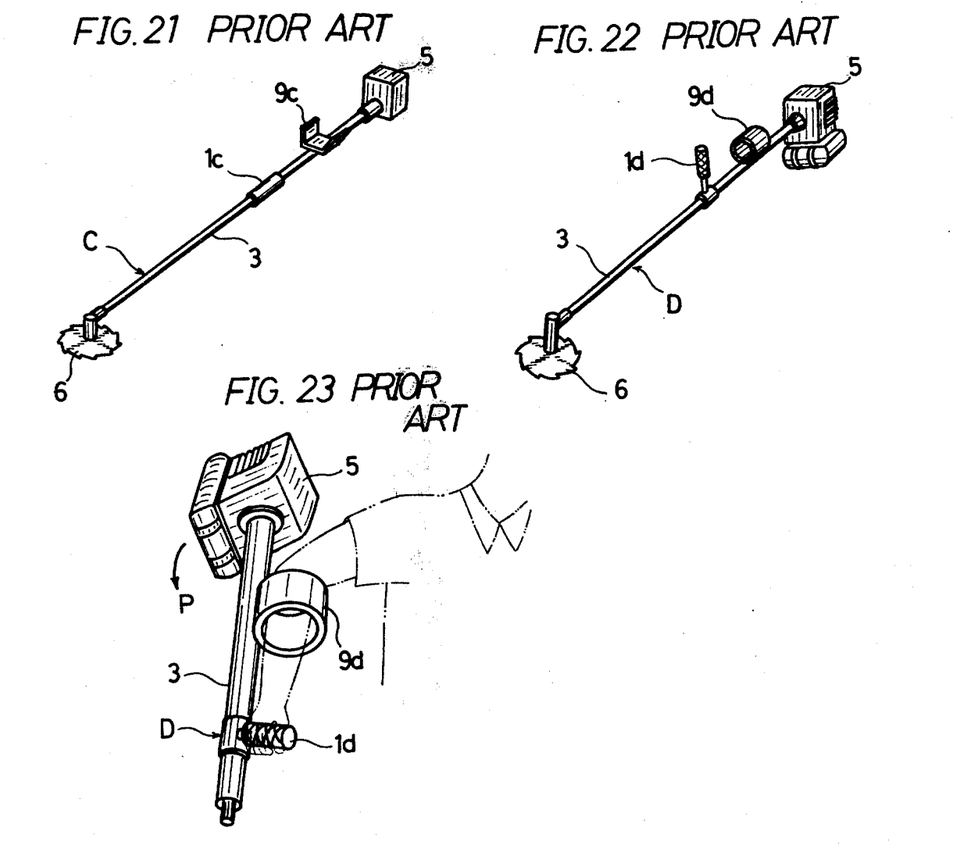

FIGS. 21 and 22 illustrate further examples of the prior art devices both disclosed in Japanese Utility Model application No. 44122/1974 (Public Disclosure No. 134226/1975), wherein an arm supporting means 9c or 9d is fixedly secured to the top side of the elongated tubular housing and in front of said arm supporting means is provided a handle grip 1c or 1d, respectively. The inventor of this type of tools C and D mentions in his specification that the tools of his invention permit single hand manipulation by placing the operator's hand on or in the arm supporting means 9c or 9d. However, such type of tool C or D as having the arm supporting means 9c or 9d is not very convenient for cutting grass or brush on the sloping ground where the cutting implement 6 must take an inclined position so as to meet the inclination of the ground surface. More particularly, the arm supporting means 9c shown in FIG. 21 does not work well in performance on the sloping ground because the operator's arm easily slips out of the place, while, on the other hand, the arm supporting means 9d as shown in FIG. 22 can prevent the slipping-out of the operator's arm, but it has a deficiency that when the tool D is tilted for the cutting performance on the sloping ground, the weight of the engine 3 causes to develop the moment of rotation in the direction of an arrow P as shown in FIG. 23, resulting in that the operator must continue to overcome the moment of rotation in order to carry out the performance, thereby causing the easy and quick fatigue of the operator. Each of the tools C, D has a further deficiency that it is very difficult to maintain the tool in good balance against the moment of rotation about the axis of the tubular housing 3, because the operator's arms must always be positioned above the tubular housing 3, resulting in that it is very difficult to change the cutting angles of the cutter 6 quickly and smoothly in accordance with variable configuration of the ground where the cutting performance is carried out.

Therefore, an object of the present invention is to eliminate the above-discussed prior art deficiencies seen in manipulation of such type of portable power operated tools as having a cutting implement mounted at one end of an elongated tubular housing and driven by a lightweight engine connected to the other end of the tubular housing, for cutting brush, mowing grass, pruning branches or performing a number of like tasks.

Another object of the invention is to provide a portable power operated tool which permits safe, correct and nimble manipulation of the toll during cutting performance not only on plain grounds but also on uneven or sloping grounds.

A further object of the invention is to provide a portable power operated tool which is capable of remarkably reducing an operator's fatigue.

A still further object of the invention is to provide a portable power operated tool which can minimize the undesirable influence upon minipulation of the tool caused by inertial force inevitably developed when the tool is swung during cutting performance.

A yet further object of the invention is to provide a portable power operated tool which permits the operator to carry out cutting performance in his comfortable posture.

A still further object of the invention is to provide a portable power operated tool which has a means for fixing the operator's forearm closely to one side of the elongated tubular housing, thereby enabling the operator to manipulate the tool correctly, easily, quickly and safely.

A further object of the invention is to provide a portable power operated tool which permits the operator to continue his cutting work with a cutting implement tilted about the axis of the elongated tubular housing by a desired angle, without being effected by the moment of rotation derived from the weight of the engine and other parts of the tool.

A still further object of the invention is to provide a portable power tool which enables the operator to easily support the tool against the reaction force developed and imparted to him when the cutting implement collides with a certain obstacle, for example a stone hidden in the brush.

A yet further object of this invention is to provide a portable power operated tool which is not complicated in construction and permits manufacture and maintenance at a low cost.

Other objects, features and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Referring now to the drawings, in particular to FIGS. 1 to 18, wherein identical reference numerals are used throughout the various views to indicate identical elements, the portable power operated tool of the present invention comprises an elongated tubular housing 10, at one end of which a cutting implement 11, for example in the form of a disk-shaped blade, is operatively mounted in the conventional manner. At the other end of said tubular housing 10, a known lightweight engine 12 is conventionally mounted. The power of the engine 12 is transmitted to the cutting implement 11 through a drive shaft 13 which passes through said tubular housing 10 in the known manner. In front of said engine 12 and adjacent one side of the tubular housing 10 is provided a fixing means for receiving and fixing the front or lower part of the operator's right arm therein, while in front of said arm fixing means, two handles are provided.

Figures 1, 2:
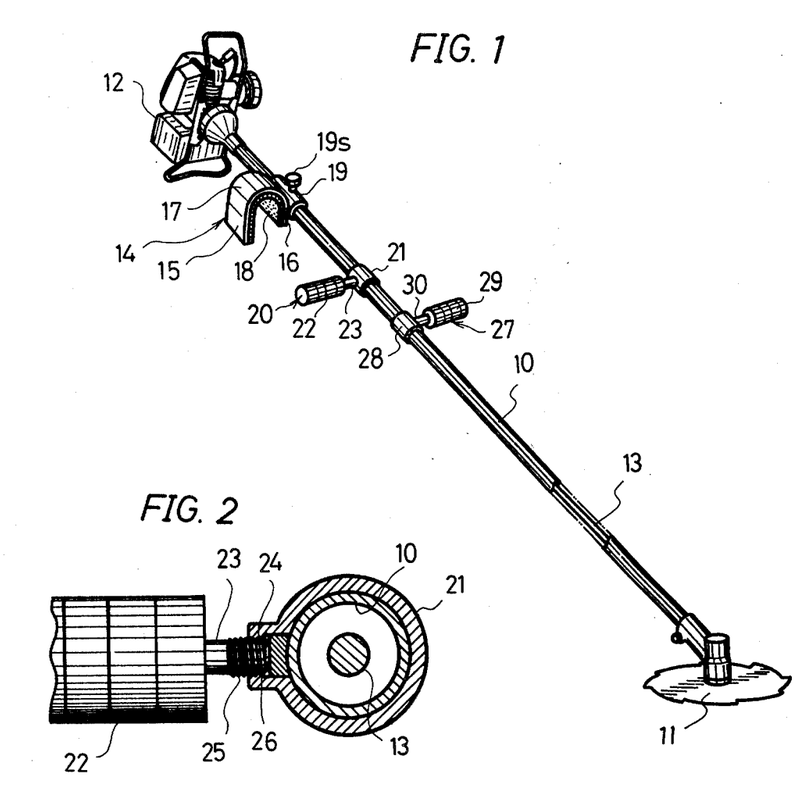
FIG. 1 is a perspective view showing the first embodiment of a portable power operated tool according to the present invention.
FIG. 2 is an enlarged partially sectional elevation showing a handle and a slide member of FIG. 1.

FIG. 1 shows the first embodiment of the present invention which is most simple in construction but implies the basic conception of the present invention, which comprises the operator's right arm fixing element 14 which is of substantially inverted U-shape, including two vertical walls 15, 16 and one curved top wall 17. The element 14 may be made of metal or any other rigid material, for example plastics of rigid character. An inner layer member 18 made of rubber, synthetic resin or the like material may preferably be provided on the internal wall surface of the element 14 in order to absorb the uncomfortable vibrations developed by the engine 12 or shocks generated when the cutting implement 11 collides with hard obstacles or objects. The fixing element 14 is fixedly secured to a tubular slide member 19 which is slidably mounted on the elongated tubular housing 10 for adjusting positions, said member 19 being positioned in front of the engine 12 and having a locking screw 19s thereon so that the member 19 can be locked at a desired position on the tubular housing. It is preferable to secure the arm fixing element 14 to the slide member 19 by welding the side wall 16 of the element 14 to one side of the member 19 as shown in FIG. 1. However, it is readily apparent that the element 14 can be secured to the member 19 by bolting or through any other suitable known connecting means.

In front of said arm fixing element 14, a first handle 20 to be grasped by the operator's right hand is provided which is connected to a slide member 21 slidably mounted on the tubular housing 10. The first handle 20 includes a grip 22 rigidly secured to a shaft 23 conventionally. The shaft 23 extends horizontally and transversely of the longitudinal axis of the tubular housing and passes through a hole 24 formed in the slide member 21. The shaft 23 is formed with male threads 25 at its free end portion, the threads being engaged with female threads 26 formed with the hole of the slide member 21, in such a manner that when the grip 22 is slightly turned in one direction, the shaft 23 advances to push the tubular housing 20 so as to lock the handle 20, and when the grip 22 is slightly turned in the opposite direction, the shaft 23 retires from the contact with the tubular housing to release the slide member 21 for free sliding movement. Further, in front of said first handle 20, a second handle 27 to be grasped by the operator's left hand is connected to a slide member 28. The construction of this handle 27 and its slide member 28 may be substantially same with that of the above described first handle 20 and its slide member 21, while a handle grip 29 and its shaft 30 being extending oppositely of said grip 22 and its shaft 23.

Figure 3:
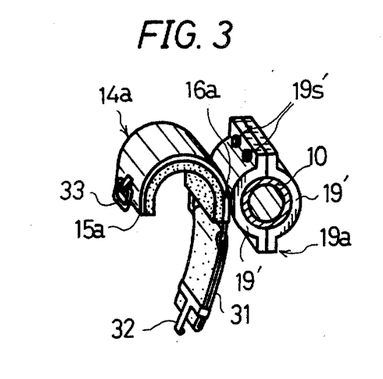
FIGS. 3 and 4 are enlarged perspective illustrations showing modifications of the operator's right arm fixing means of the present invention, respectively.

FIG. 3 shows a modification of the operator's right arm fixing element, wherein a band 31 made of rubber, synthetic resin, leather or the like flexible material is connected at one end to the lower end of the vertical wall 16a of the element 14a. The band 31 has at its free end portion a known fastening means 32, for example a hook, which is detachable with a ring 33 secured to the vertical wall 15a of the element 14a. Further, in place of said tubular slide member 19, a modified slide member 19a may be employed which is composed of a pair of semi-circular pieces 19' connected together by means of adjusting screws 19s'.

Figure 4:
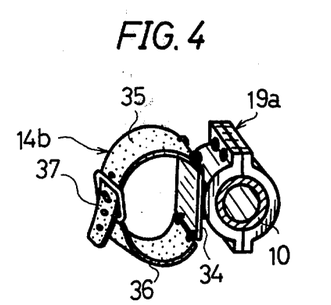

FIG. 4 shows a further modification of the operator's right arm fixing element, wherein the element 14b comprises a metallic plate 34 extending vertically and welded to one side of the slide member, an upper band 35 connected at one end to the upper end of said plate 34 and a lower band 36 connected at one end to the lower end of said plate 34. Both of the free ends of said bands 35, 36 are detachably connected with a known fastening means 37. It should be noted that each of said arm fixing elements 14, 14a, or 14b should not be mounted onto the top side of the slide members 19 or 19a but onto the side where said first handle 20 extends.

Figures 5, 6, 7:
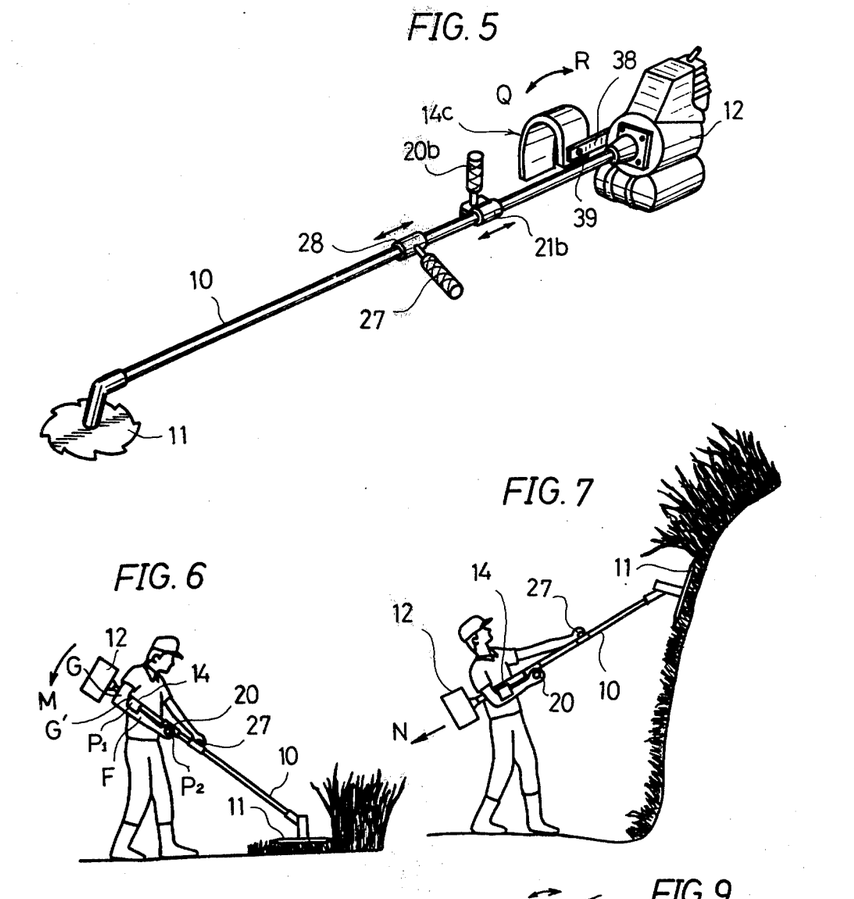
FIG. 5 is a perspective view showing the second embodiment of the portable power operated tool of the present invention.
FIGS. 6 to 9 are schematic illustrations showing the operational manners of the tool of the present invention.

FIG. 5 shows the second embodiment of the tool of the present invention wherein the arm fixing element 14c is mounted to a supporting arm 38 which is secured to a suitable part of the engine 12 and extends forwardly in parallel with the tubular housing. The element 14c is supported by the arm 38 so as to move about the support pin 39 in the directions of arrows Q, R. In place of said first handle 20, an upright type of first handle 20b may be utilized, which is conventionally secured to a modified slide member 21b known per se.

In operation, when the operator's right arm is received and fixed within the element 14, the greater part of weight of the apparatus can be supported by his right arm. Since the weight of the engine 12 is much heavier than any other part of the apparatus, the moment of rotation about the longitudinal axis of the first handle 21 is naturally developed as shown by the arrow M in FIG. 6. However, by provision of the element 14, this moment of rotation is restricted without fail by the operator's right arm fixed within the element 14. In addition, because the apparatus is supported at two points $P_1$, $P_2$(element 14, grip 22) and the straight line that passes through the points $P_1$, $P_2$ is substantially in parallel with the axial line of the tubular housing 10, the operator's right arm F and the tubular housing can be, in manipulation, moved together as if they were integral with each other. Further, the whole apparatus is also supported by the operator's left hand at the second handle 27 in addition to said support at the points $P_1$, $P_2$, resulting in that the apparatus can be supported in good balance during manipulation. In this connection, it should be noted that although the front or lower part F of the operator's right arm is bound within the fixing element 14, the rear or upper part G of his right arm as well as his left arm are not restricted from movement. Thus, the operator can manipulate the apparatus freely with his both arms, so that any complicated cutting works can be carried out quickly and easily. Further, the operator can perform his work with his right elbow positioned close to the engine 12, it is possible to minimize the undesirable inertial force which inevitably develops when the apparatus is swung, thereby facilitating easy, quick and safe manipulation of the apparatus.

Figure 9:
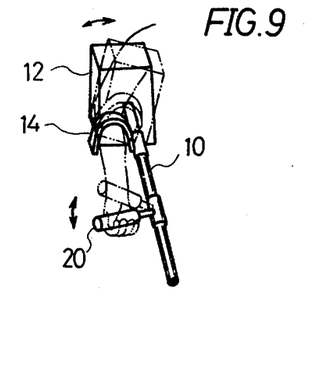

Furthermore, since the arm fixing element 14 is positioned adjacent one side of the tubular housing 10, it is very easy for the operator to turn, merely by using his right arm, the tubular housing about its axis by a certain angle as particularly shown in FIG. 9 in order to change cutting angles of the blade 11 during operation for even on uneven or sloping grounds. This feature of the present invention is not seen in the particular prior art apparatus with a U-shaped handle 8 as shown in FIG. 20.

According to the present invention, when the cutting implement 11 collides with an obstacle such as a stone and is repulsed by the reaction force toward the operator's feet, such reaction force is easily eliminated by the forward lower part G' of the operator's upper arm which is ready to contact with the rear wall of the fixing element 14, thereby preventing the cutting implement 11 from reaching the operator's feet, assuring safety in operation.

In performance with the tubular housing directed upwardly as shown in FIG. 7, a force component of the weight of the engine 12 develops in the direction of an arrow N. Thus, because the force component is securely supported by the lower front part G' of the operator's upper arm via the element 14 which fixes his elbow, and because the operator's right arm and the tubular housing 10 are substantially in integral relation with each other, the same effects described in the foregoing in connection with FIG. 6 are obtained.

Figure 8:
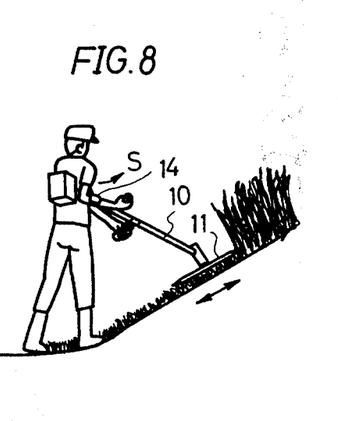

Further, in mowing the grass on the sloping ground, with the tubular housing turned by a certain angle about its axis in order to keep the cutting blade 11 tilted as shown in FIG. 8, the moment of rotation about the axis of the tubular housing caused by the weight of the engine hardly affects on manipulation of the tool, because the moment of rotation can be easily eliminated by cooperation of the operator's elbow and the element 14. Thus, the operator need not spend his considerably great physical force in order to overcome the moment of rotation as indicated by the arrow P in FIG. 23, resulting in that the operator can easily perform his mowing work without being fatigued in a very short time. In this operation on the sloping ground, the operator is permitted to use the upper part G of his right arm very effectively, since the fixing element 14 does not bind said upper part G of his arm from movement although the lower or front part F of his arm and the tubular housing 10 are kept substantially integral with each other. Therefore, it is very easy for the operator to move his arm in the direction of an arrow S in FIG. 8 in order to freely manipulate the apparatus. In addition, the operator can freely move his upper arm G back and forth as well as twist his lower arm F freely about its axis as shown in FIG. 9. As a result, the operator can manipulate the apparatus very freely and easily to carry out many complicated cutting performances.

Figures 10, 11, 12:
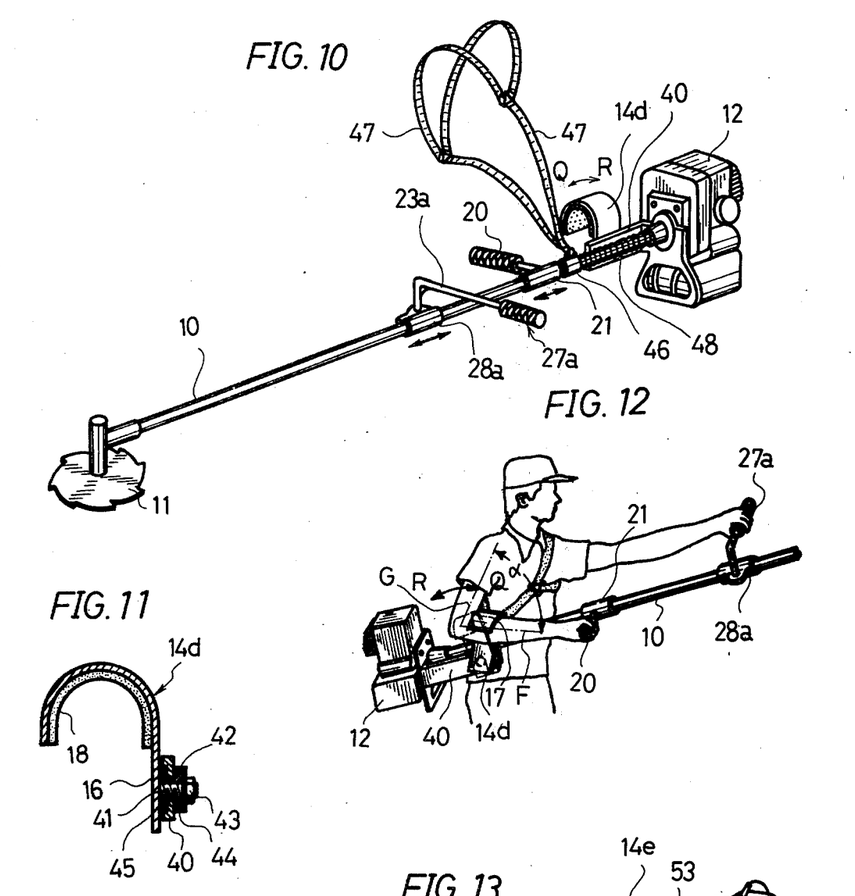
FIG. 10 is a perspective view of a third embodiment of the tool of the present invention.
FIG. 11 is an enlarged sectional view of the operator's right arm fixing means shown in FIG. 10.
FIG. 12 is a perspective partial illustration showing the operational manner of the tool shown in FIG. 10.

FIG. 10 shows the third embodiment of the tool of the present invention, wherein a supporting arm 40 extends from the engine frame. The operator's arm fixing element 14d is secured to a threaded shaft 41 by welding or any other conventional ways. The shaft 41 passes through a hole formed in the supporting arm 40 and is clamped by a nut 43, so that said element 14d is supported by the arm 40 so as to turn about said shaft 41 in the directions of arrows Q, R. In FIG. 11, reference numerals 44, 45 designate shock absorbing rubber pads which may preferably be interposed between the nut 43 and the arm 40 and also between the arm 40 and the vertical wall 16 of the element 14d, respectively. In front of the free end of the supporting arm 40, the first slide member 21 is mounted on the tubular housing 10 so as to be slidable thereon. The first handle 20 is secured to said slide member 21 in the same manner as described in the foregoing. In front of said first handle 20, the second slide member 28a is slidably mounted on the tubular housing 10. The second handle 27a having a L-shaped shaft 23a is connected to said second slide member 28a conventionally. In position between said first slide member 21 and the engine 12, a third slide member 46 may be slidably mounted on the tubular housing 10, and shoulder straps 47 may be secured to said slide member 46. Preferably, a compressed coil spring 48 may be mounted on the tubular housing so as to be interposed between said slide member 46 and the engine 12, so that the slide member 46 is urged toward the first slide member 21 by the function of said compressed spring 48.

In operation, since the element 14d is arranged so as to be movable about the shaft 41 in the directions of the arrows Q, R, the operator can hold the apparatus very easily by his right arm in every vertical direction without pain to his right arm. More particularly, for instance, when the tubular housing 10 is directed upwardly as shown in FIG. 12, the angle α determined by the upper part G and the front part F of the operator's arm can be small since the element 14d is arranged so as to tilt in the direction of the arrow Q. Consequently, the front part F (FIG. 12) of his arm and the top wall 17 of the element 14d extend in parallel with each other. Thus, the marginal edges of the element 14d do not bite into the operator's right arm. If the element 14d is rigidly secured to the tubular housing, the element 14d takes the position as shown in phantom line in FIG. 12, which causes to give pains to the operator's right arm. It is apparent that by provision of said straps 47, the operator can carry the apparatus more easily. Said coil spring 48 serves as a cushion.

Figure 13:
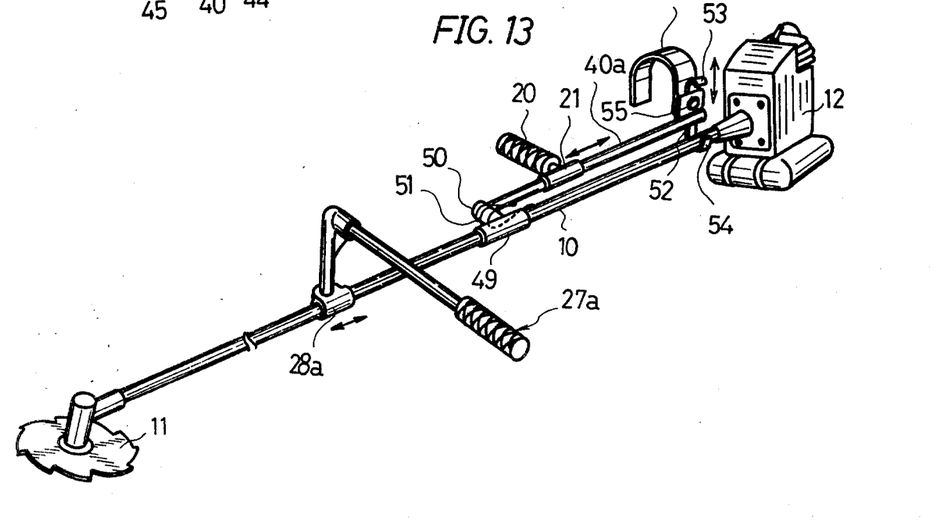
FIG. 13 is a perspective view showing the fourth embodiment of the tool of the present invention.

FIG. 13 shows the fourth embodiment of the present invention, wherein a slide member 49 is slidably mounted on the tubular housing 10. A horizontal extension 50 is secured at right angles to said slide member 49 so as to be rotatable about its axis, said extension 49 being positioned on the same side with an operator's arm fixing element 14e. A supporting arm 40a is rigidly connected to said extension 50 at right angles thereto, so that it extends in parallel with the tubular housing 10. On said extension 50, a coil spring or the like resilient member 51 is mounted with its one end engaged with said tubular housing and the other end with said supporting arm 40a in such a manner that the arm 40a is swingable about said extension on the vertical plane. The member 51 is strong enough to usually urge said arm 40a downwardly. To the free end of the arm 40a, a vertical piece 52 is rigidly secured. The piece 52 has at its top end an upper hook 53 and at its lower end a lower hook 54, respectively. The hooks 53, 54 are engageable with the tubular housing to restrict up-and-down movement of the arm 40a, though the tubular housing 10 is usually supported by the lower hook 54 as long as the apparatus is in normal cutting position as shown in FIG. 13.

The distance between the hooks 53, 54 and the strength of said resilient member 51 should be predetermined in such a manner that the operator can carry out his cutting performance in the most natural posture as well as in such a manner that the undesirable moment of rotation as above described is minimized when the tubular housing 10 is turned by a certain angle about its longitudinal axis during operation on the sloping ground, to be described hereinafter. The operator's arm fixing element 14e is connected to said piece 52 so as to turn about a support pin 55. The first slide member 21 is slidably mounted on said supporting arm 40a in position between said element 14e and said extension 50. The first handle 20 is connected to said slide member 21 in the manner as described in the foregoing. The second handle 27a is connected to the second slide member 28a which is slidably mounted on the tubular housing.

Figure 14:
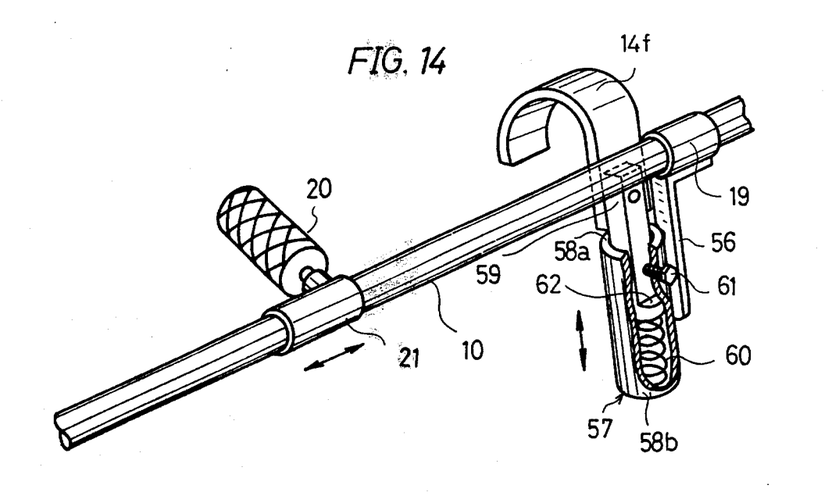
FIG. 14 is an enlarged fragmentary perspective view showing the fifth embodiment of the present invention.
Figure 15:
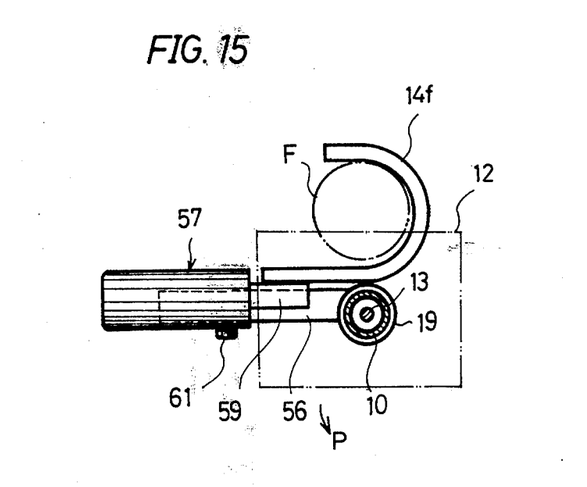
FIG. 15 is a schematic elevation taken in the axial direction, showing the tool of FIG. 14 in the state where the tool is turned by 90° about its longitudinal axis.

FIGS. 14 and 15 show the fifth embodiment of the present invention, wherein the slide member 19 mounted slidably on the tubular housing 10 has a vertical member 56 rigidly secured to and extended perpendicularly from said slide member 19. A hollow cylindrical member 57 having an open top end 58a and a bottom wall 58b is supported by said vertical member 56 so as to extend vertically. A vertical slide piece 59 is partially received within said hollow member 57 so as to move up and down resiliently within a certain predetermined range by means of a coil spring 60 interposed between said bottom wall 58b and the lower end of said slide piece 59. The coil spring 60 is arranged so as to normally pull down the slide piece 59 by a sufficient pulling force thereof. The upward movement of said slide piece 59 is restricted by means of a stopper 61 which is screwed into the side wall of said hollow member 57 so as to be contactable with a shoulder 62 formed with the slide member 59. The length of said hollow member 57, the strength of said coil spring 60 and the location of said stopper 61 should be predetermined so that the undesirable moment of rotation can be minimized when the tubular housing 10 is turned by a certain angle about its axis in order to carry out the operation on the sloping or like ground.

In the above-described fourth and fifth embodiments, when the tubular housing 10 is turned by about 90° about its longitudinal axis, the arm fixing element 14e (FIG. 13) is automatically shifted in position by the function of said resilient member 51 so that the upper hook 53 come into engagement with the tubular housing 10, while the arm fixing element 14f (FIG. 14) is likewise automatically pulled in the horizontal direction to draw near the tubular housing 10 by the pulling function of the spring 60, because, in this situation, the weight of the engine 12 and other parts of the tool does not directly act upon the resilient member 51 or the spring 60. Thus, it is possible to minimize the undesirable moment of rotation P caused by the weight of the engine, etc., during operation on the sloping or like ground. In contrast thereto, the prior art apparatus as shown in FIGS. 21 and 22, said moment of rotation is developed to the maximum as apparent in comparison of FIG. 23 with FIG. 15.

Figure 16:
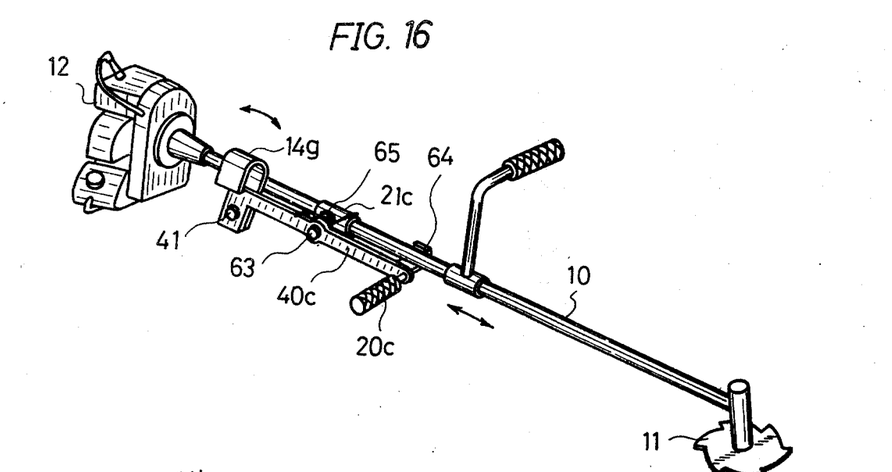
FIG. 16 is a perspective view of the sixth embodiment of the tool of the present invention.

FIG. 16 shows the sixth embodiment of the present invention, wherein a supporting arm 40c is connected at its midportion to a shaft 63 secured to a slide member 21c which is axially slidable on the tubular housing 10. The arm 40c is movable about said shaft 63 on the vertical plane. The operator's arm fixing element 14g is mounted on one end of the supporting arm 40c so as to movable about the shaft 41 in the same manner as described in the foregoing. The first handle 20c is secured at right angles to the other end of the arm 40c so as to extend horizontally in one direction. An extension 64 is also secured at right angles to the same end so as to extend in the direction opposite to the first handle 20c. The extension 64 is arranged so as to support the tubular housing at underside thereof as illustrated in FIG. 16.

Figure 17:
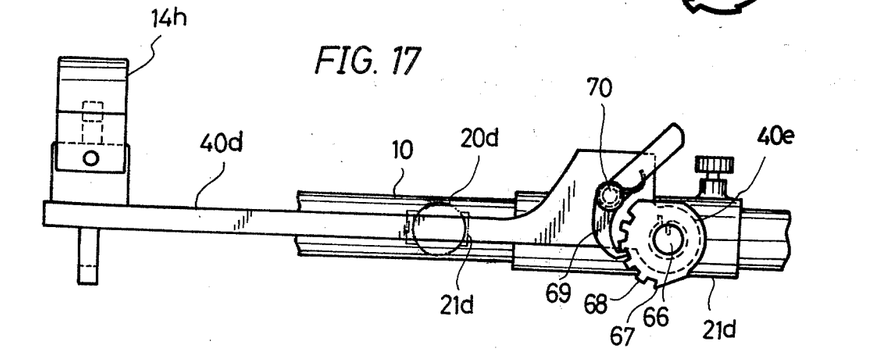
FIG. 17 is an enlarged fragmentary elevation showing the seventh embodiment of the tool of the present invention.

FIG. 17 shows the seventh embodiment of the present invention, wherein the operator's arm fixing element 14h is arranged so as to be adjustable in vertical position so that the element 14h can be locked at a selected position. The element 14h is mounted to one end of a supporting arm 40d which is pivotally mounted to a support pin 66 inserted through one extremity 40e of the arm 40d and secured to a slide member 21d which is rigidly secured to said tubular housing 10. A disk member 67 is rigidly secured to said pin 66. The disk member 67 has dents 68 formed with circumference of the member 67. The dents 68 are arranged so as to be selectively engageable with a claw 69 which is pivotally mounted on a support pin 70 secured to the other end of said arm 40d. Thus, by engaging the claw 69 with the selected dents of the disk member 67, the arm 40d can be locked at a desired position within a predetermined range, so that the element 14h is adjustable above and below the level position as shown in FIG. 17. The first handle 20d is connected to the slide member 21d mounted on the arm 40d in the same manner as described in the foregoing.

In operation of the embodiments illustrated in FIGS. 13 to 17 wherein each of the arm fixing elements 14e, 14d, 14g, 14h is adjusted so as to be located above the level of the tubular housing 10, the operator is permitted to take a most comfortable posture in performance on a plane field. More specifically, in the cutting performance on the plane ground where the cutting implement 11 need not be slanted by a certain angle about the longitudinal axis of the tubular housing 10, it is preferable that the angular distance between the operator's front arm F and the level of the tubular housing is sufficiently large. The particular embodiments of FIGS. 13 to 17 are advantageous in this point.

Figure 18:
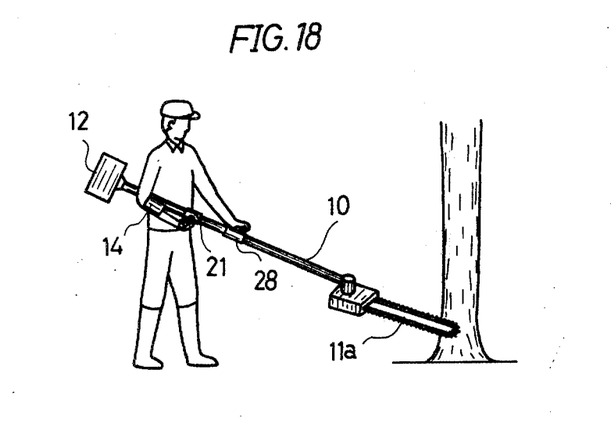
FIG. 18 is a schematic illustration showing the construction and operational manner of a further embodiment of the tool of the present invention, in which the tool is utilized as a chain saw.

It is readily apparent to those skilled in the art that the present invention is applicable to a chain saw by utilizing an endless chain saw type cutting implement 11a as particularly shown in FIG. 18, in place of the rotary blade type cutting implement 11.

As described in the foregoing, the portable power operated tool of the present invention has such advantageous features that the operator can always hold the tool in good balance by means of the operator's arm fixing element provided on the right-hand side of the elongated tubular housing; that by use of the arm fixing element it is possible to minimize undesirable moments of rotation caused by the weight of the engine and other parts of the apparatus when the tubular housing is turned by a certain angle about its longitudinal axis or when the cutting implement is swung up and down; that by use of the arm fixing element it is possible to easily overcome a considerably great inertial force developed to the engine when the cutting implement is swung in one direction; that by use of the arm fixing element it is very easy to cut brush, mow grass grown on the sloping or uneven ground; and that the portable power tool of the invention permits safe, correct and nimble manipulation by means of the arm fixing element.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

It is claimed:
1. A portable power operated tool which comprises
   an elongated tubular housing,
   an engine mounted to one end of said tubular housing,
   a cutting implement mounted to the other end of said tubular housing,
   a drive shaft which passes through said tubular housing for transmitting power from said engine to said cutting implement,
   a fixing element for receiving and fixing a front part of an operator's arm,
   said fixing element being located in position near said engine and along with one side of said elongated tubular housing,
   a first handle located in front of and spaced from said fixing element,
   a handle grip connected to said first handle and disposed on the same side with said fixing element, and
   a second handle located in front of and spaced from said first handle.
2. The portable power operated tool as defined in claim 1, wherein
   said fixing element has a substantially inverted U-shaped configuration having two vertical side walls and a top wall.
3. The portable power operated tool as defined in claim 1, wherein
   said fixing element is made of rigid material, and
   an inner layer member made of flexible material is provided with internal surface of said fixing element.

4. The portable power operated tool as defined in claim 2, wherein
said fixing element includes a fastening band connected at its one end to one of said vertical side walls of the fixing element, and
a free end of said band is detachable to the other of said vertical side walls of the fixing element.

5. The portable power operated tool as defined in claim 1, wherein
said fixing element includes a vertical metal plate,
an upper band connected at one end to an upper portion of said metal plate,
a lower band connected at one end to a lower portion of said metal plate, and
a fastening means adapted to connect free ends of said upper and lower bands together.

6. The portable power operated tool as defined in claim 1, wherein
said fixing element is supported by a tubular slide member which is slidably mounted on said elongated tubular housing.

7. The portable power operated tool as defined in claim 6, wherein
said fixing element is pivotally supported by a support pin which is secured to and extends at right angles from said tubular slide member.

8. The portable power operated tool as defined in claim 1, wherein
said fixing element is supported by a supporting arm which extends in substantially parallel with said elongated tubular housing.

9. The portable power operated tool as defined in claim 8, wherein
said fixing element is pivotally supported by a support pin which is secured to and extends at right angles from said supporting arm.

10. The portable power operated tool as defined in claim 8, wherein
said supporting arm is secured at its one end to one side of said engine.

11. The portable power operated tool as defined in claim 8, wherein
said supporting arm is connected to and supported by a slide member which is slidably mounted on said elongated tubular housing.

12. The portable power operated tool as defined in claim 11, wherein
said supporting arm is pivotally supported at forward end thereof by said slide member via an extension which extends horizontally and transversely from said slide member,
said fixing element being mounted to a rear end of said supporting arm, and
said first handle is connected to a slide member which is slidably mounted on said supporting arm.

13. The portable power operated tool as defined in claim 12, which includes
a resilient means adapted to normally urge said supporting arm downwardly, and
an upper and a lower hooks provided at free end of said supporting arm so as to restrict pivotal movement of said supporting arm.

14. The portable power operated tool as defined in claim 12, wherein
a disk member with dents is secured to said extension, and
a claw is pivotally connected via a support pin to a forward end portion of said supporting arm so as to be selectively engageable with said dents for locking the supporting arm at a desired position.

15. The portable power operated tool as defined in claim 11, wherein
said supporting arm is pivotally connected at its midportion to said slide member mounted on said elongated tubular housing,
said supporting arm having at its rear end said fixing element mounted thereon and having at its forward end said first handle connected thereto,
a coil spring adapted to normally urge said rear end of the supporting arm downwardly, and
an extension extending horizontally from said supporting arm so as to be engageable with underside of said supporting arm.

16. The portable power operated tool as defined in claim 1, which includes
a vertical hollow member having an open top end and a bottom end wall and supported by said slide member mounted on said elongated tubular housing,
a vertical slide piece partically disposed within said hollow member so as to be resiliently movable up and down by means of at least one coil spring interposed between a lower end of said slide piece and said bottom wall, and
said coil spring being arranged so as to normally urge said slide piece downwardly, and
said fixing element being supported by said slide piece.

17. The portable power operated tool as defined in claim 1, wherein
said cutting implement is a rotary saw blade.

18. The portable power operated tool as defined in claim 1, wherein
said cutting implement is an endless chain saw.

* * * * *